(12) United States Patent
Chen et al.

(10) Patent No.: US 9,291,866 B2
(45) Date of Patent: Mar. 22, 2016

(54) LIQUID CRYSTAL DISPLAY PANEL

(71) Applicant: Himax Display, Inc., Tainan (TW)

(72) Inventors: Wen-Hsu Chen, Tainan (TW); Hsing-Lung Wang, Tainan (TW); Yuet-Wing Li, Tainan (TW); Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 95 days.

(21) Appl. No.: 14/229,363

(22) Filed: Mar. 28, 2014

(65) Prior Publication Data
US 2015/0277167 A1   Oct. 1, 2015

(51) Int. Cl.
*H01L 21/00*   (2006.01)
*G02F 1/1345*   (2006.01)
*G02F 1/1337*   (2006.01)

(52) U.S. Cl.
CPC ............ *G02F 1/1345* (2013.01); *G02F 1/1337* (2013.01); *G02F 2202/16* (2013.01)

(58) Field of Classification Search
CPC .............. G02B 27/2214; G02F 1/1334; G02F 1/133526; G02F 1/133512; H01L 21/00
See application file for complete search history.

(56) References Cited

U.S. PATENT DOCUMENTS

| 7,785,494 | B2 | 8/2010 | Yeh | |
| 2009/0035553 | A1* | 2/2009 | Yeh | H01B 1/22 428/323 |
| 2012/0002142 | A1* | 1/2012 | Asaoka | G02F 1/133512 349/86 |
| 2012/0008057 | A1* | 1/2012 | Takahashi | G02B 27/2214 349/15 |

FOREIGN PATENT DOCUMENTS

| TW | I366836 | 6/2012 |
| TW | 201319668 | 5/2013 |
| TW | 201330277 | 7/2013 |

OTHER PUBLICATIONS

"Office Action of Taiwan Counterpart Application", issued on Dec. 7, 2015, p. 1-p. 5.

* cited by examiner

*Primary Examiner* — Whitney T Moore
*Assistant Examiner* — Joseph Galvin, III
(74) *Attorney, Agent, or Firm* — J.C. Patents

(57) ABSTRACT

A liquid crystal display panel including a bottom layer, a first alignment layer, a liquid crystal layer, a second alignment layer, a top layer and a plurality of conductive connectors electrically connecting the top layer and the bottom layer is provided. Each of the plurality of conductive connectors includes conductive powders.

11 Claims, 4 Drawing Sheets

LIQUID CRYSTAL DISPLAY PANEL

BACKGROUND

1. Technical Field

The present invention relates to a display device, and more particularly, to a liquid crystal on silicon (LCOS) display panel.

2. Description of Related Art

A liquid crystal on silicon (LCOS) display is one type of liquid crystal displays (LCDs), consisting of a liquid crystal layer sandwiched between a silicon wafer and a glass plate. The silicon chip is manufactured using standard complementary metal oxide semiconductor (CMOS) technology, which provides higher stability and reliability when compared with the LCD. Compared with TFT-LCD panels, the LCOS display panels have many merits, including the high resolution, high contrast, wide viewing angle and low costs. At present, the LCOS display panels have been widely applied to video and media equipments, such as handy cameras, digital cameras, projection TVs, and multi-media overhead projectors.

SUMMARY

The present invention is to provide a LCD or LCOS display panel with enhanced electric conductivity and improved product reliability.

The present invention provides a liquid crystal display panel including a bottom layer, a first alignment layer, a liquid crystal layer, a second alignment layer, a top layer and a plurality of conductive connectors electrically connecting the top layer and the bottom layer. The first alignment layer is disposed on the bottom layer, and the liquid crystal layer is disposed on the first alignment layer. The second alignment layer is disposed on the liquid crystal layer, and the top layer is disposed on the second alignment layer. Each of the plurality of conductive connectors includes conductive powders.

In an embodiment, the display panel has a display area and a non-display area outside and surrounding the display area and the plurality of conductive connectors is located in the non-display area. The areas of the conductive connectors may be regions for applying a common voltage (Vcom) from the bottom layer to the top layer.

In an embodiment, the top layer is an indium tin oxide (ITO) glass plate and the bottom layer is a silicon chip.

In an embodiment, a material of the first alignment layer includes polyimide or oblique silicon oxide and a material of the second alignment layer is polyimide or oblique silicon oxide.

In an embodiment, each of the plurality of conductive connectors includes the conductive powders dispersed in a resin and the conductive powders aggregate to form filamentary aggregates. The sizes of the filamentary aggregates may be in a range of 2~50 μm.

In an embodiment, the conductive powders are nickel (Ni) powders, nickel alloy powders, silver (Ag) powders, gold (Au) powders, copper (Cu) powders, platinum (Pt) powders, graphite powders or powders of conducting polymers.

In an embodiment, the conductive powders are nickel (Ni) powders and each of the nickel powders has a particle diameter of several tenths of a micron. For example, the nickel powders are of a particle diameter of 0.01~1.8 μm. The conductive powders may also have a thorny and spherical structure.

In order to make the aforementioned and other objects, features and advantages of the present invention comprehensible, several non-limiting embodiments accompanied with figures are described in detail below.

BRIEF DESCRIPTION OF THE DRAWINGS

The accompanying drawings are included to provide a further understanding of this invention, and are incorporated in and constitute a part of this specification. The drawings illustrate embodiments of the invention and, together with the description, serve to explain the principles of the invention.

DESCRIPTION OF EMBODIMENTS

Figure 1A:
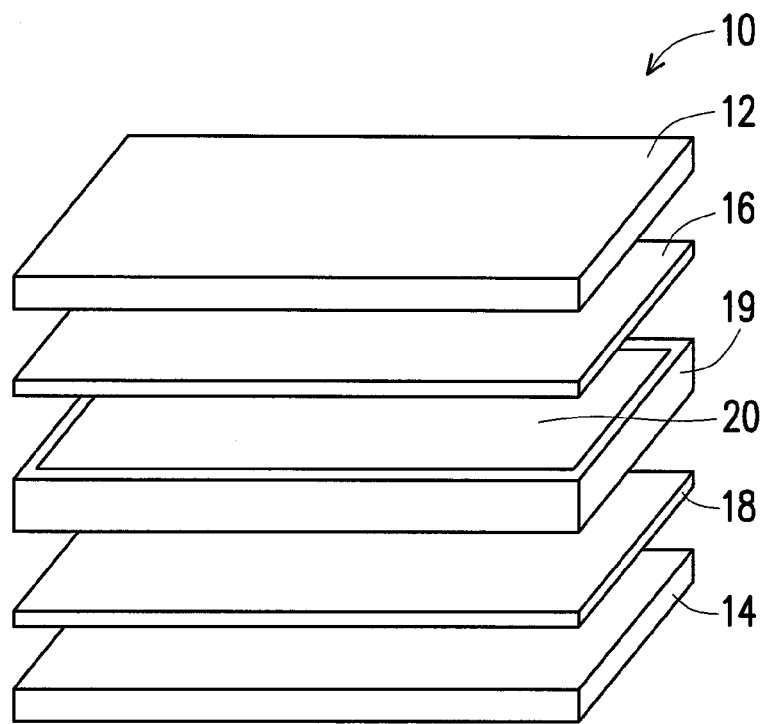
FIG. 1A is a schematic three-dimensional view of disassembled parts of a LCD panel before assembling according to an embodiment of the invention.

Reference will now be made in detail to the embodiments of the invention, examples of which are illustrated in the accompanying drawings. Wherever possible, the same reference numbers are used in the drawings and the description to refer to the same or like elements.

Figure 1B:
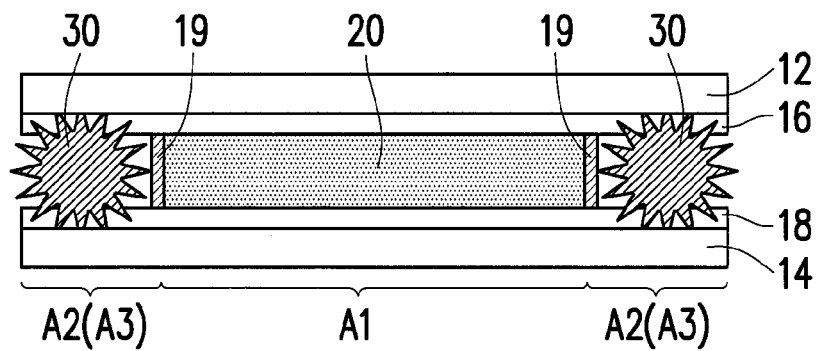
FIG. 1B is a schematic cross-sectional view of the assembled LCD panel of FIG. 1A according to an embodiment of the invention.
Figure 1C:
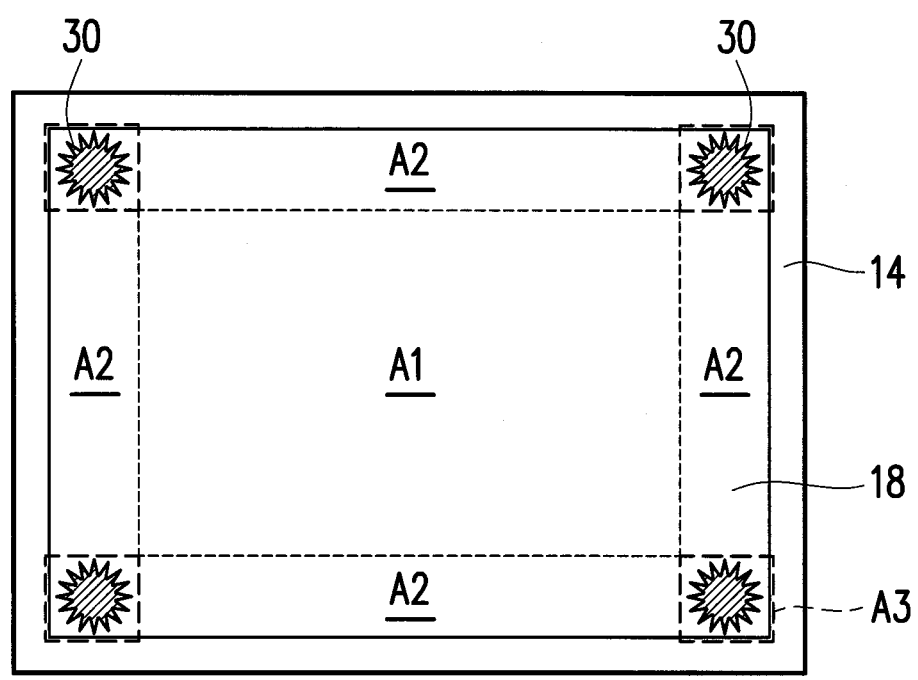
FIG. 1C is a schematic top view of a portion of the LCD panel according to an embodiment of the invention.

FIG. 1A is a schematic three-dimensional view of disassembled parts of a LCD panel before assembling according to an embodiment of the invention. FIG. 1B is a schematic cross-sectional view of the assembled LCD panel of FIG. 1A according to an embodiment of the invention. FIG. 1C is a schematic top view of a portion of the LCD panel according to an embodiment of the invention.

Referring to FIGS. 1A and 1B, the LCD panel 10 sequentially includes a top layer 12, a first alignment layer 16, a liquid crystal layer 20, a second alignment layer 18 and a bottom layer 14. In the embodiment, when the top layer 12 is a glass substrate and the bottom layer 14 is a silicon based substrate, such as a silicon chip, the LCD panel 10 is a liquid crystal on silicon (LCOS) panel. However, the type of the LCD panel 10 included within the scope of this invention is not limited by the embodiments. The materials of the first and second alignment layers may be polyimide (PI), for example. The top layer 12 may be an ITO glass plate, a transparent glass plate coated with a transparent indium tin oxide (ITO) coating, for example. For example, a material of the first alignment layer 16 or the second alignment layer 18 may include polyimide or oblique silicon oxide (i.e. obliquely evaporated silicon oxide film).

The disassembled parts of the LCD panel of FIG. 1A may be assembled through a pressing process using a hot pressing device, a vacuum pressing device or a pressing device with UV-irradiation. The type of the pressing process or device is not limited thereto.

After assembling, the liquid crystal layer 20 is sandwiched between the first and second alignment layers 16, 18 and located between the top layer 12 and the bottom layer 14. The liquid crystal layer 20 may be formed by filling liquid crystals (not shown) in a space enclosed by the top layer 12 and the bottom layer 14 and a sealant 19 located between the first and second alignment layers 16, 18.

The LCD panel 10 has a display area A1 and a non-display area A2 outside the display area A1. The LCD panel 10 comprises conductive connectors 30 electrically connecting the top layer 12 and the bottom layer 14. The conductive connectors 30 are located in corner areas A3 of the non-display area A2. The corner areas A3 may be areas or regions for applying the common voltage (Vcom), i.e. the Vcom areas, for example.

Before assembling, as shown in FIG. 1C, the conductive connectors 30 may be disposed within the Vcom areas A3 and disposed on the second alignment layer 18. After assembling, the conductive connectors 30 may pierce through the first alignment layer 16 and the second alignment layer 18 and directly contact with the top layer 12 and the bottom layer 14, as shown in FIG. 1B. In this embodiment, the second alignment layer 18 is not patterned to partially remove the second alignment layer 18 in the Vcom areas A3 and the conductive connectors 30 are disposed directly on the second alignment layer 18 before assembling.

In general, according to the previous embodiment, if the conductive connectors containing the filamentary aggregates of the fine conductive powders are applied directly on the alignment layer and in the Vcom areas, good electric conductivity is attained for the display panels, as the conductive powders can prick through the alignment layer. The display panel of this invention has almost 100% successful conducting rate for electrical conductivity.

Through experimentations, the display panel(s) of this invention using the conductive connectors containing the filamentary aggregates of the fine conductive powders, the display panel of this invention passes the reliability tests and shows good reliability and the results are shown in Table 1.

TABLE 1

Ni ball RA test

| Item | Condition | Result |
|---|---|---|
| HTHHst | 60° C., 90% RH | 500 hrs pass |
| HTst | 85° C. | 500 hrs pass |
| LTst | −40° C. | 500 hrs pass |
| Thermal cycling | −40° C. (23 min)~85° C. (23 min) | 500 cycle pass |
| ALT | 193 mbar | 72 hrs pass |

Figure 2A:
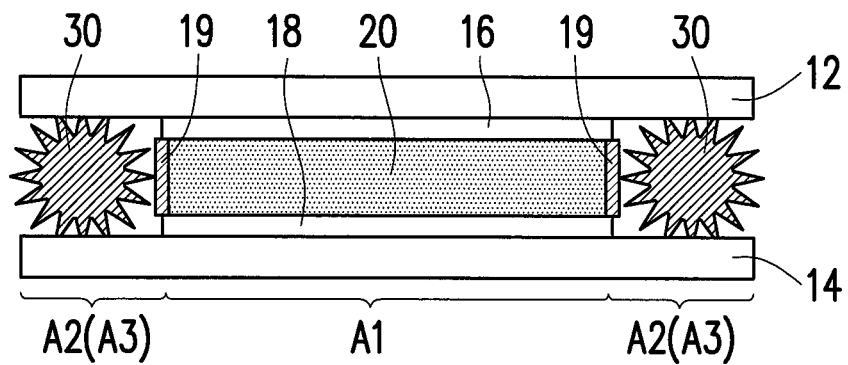
FIG. 2A is a schematic cross-sectional view of the assembled LCD panel according to another embodiment of the invention.
Figure 2B:
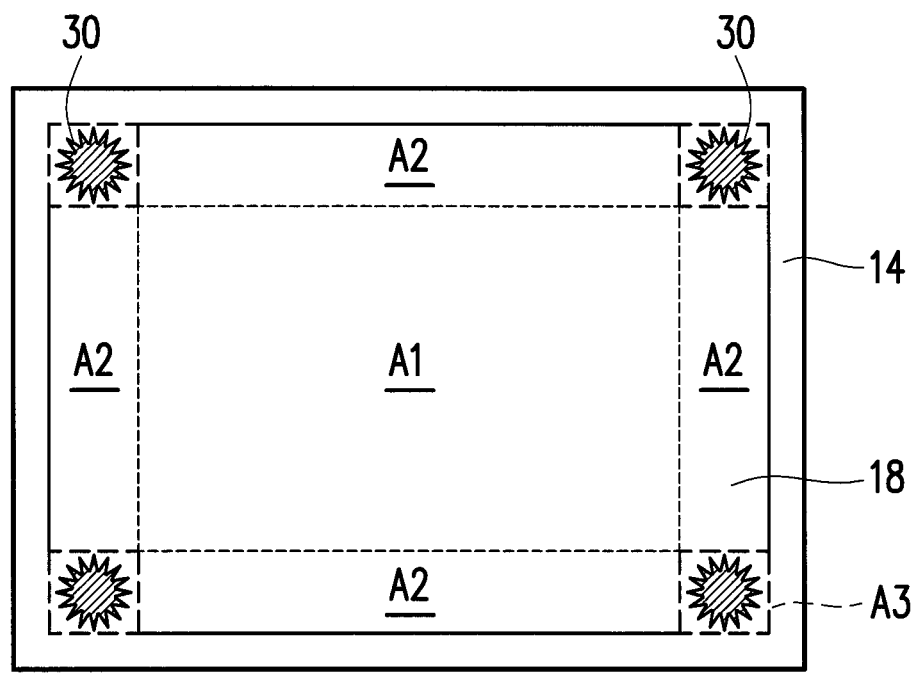
FIG. 2B is a schematic top view of a portion of the LCD panel according to another embodiment of the invention.

HTHHst: Test of storage in the environment of high temperature and high humidity
HTst: Test of storage in the environment of high temperature
LTst: Test of storage in the environment of low temperature
ALT: Altitude Test FIG. 2A is a schematic cross-sectional view of the assembled LCD panel according to another embodiment of the invention. FIG. 2B is a schematic top view of a portion of the LCD panel according to another embodiment of the invention. Alternatively, as shown in another embodiment of FIG. 2B, the conductive connectors 30 may be disposed directly on the bottom layer 14 and within the Vcom areas A3. After assembling, the conductive connectors 30 may directly contact with the top layer 12 and the bottom layer 14, as shown in FIG. 2A. In this embodiment, the first alignment layer 16 and the second alignment layer 18 are patterned to partially remove the alignment layers in the Vcom areas A3 before assembling.

According to the embodiments of this invention, the material of the conductive connectors 30 may be an anisotropic conductive material, such as a mixture of conductive powder(s) dispersed in a resin. The conductive powder(s) may aggregate to form a three-dimensional chain-like network structure (i.e. filamentary aggregates). The conductive powder(s) may be nickel (Ni) powders, nickel alloy powders, silver (Ag) powders, gold (Au) powders, copper (Cu), platinum (Pt) powders, graphite powders or conducting polymers, for example. Preferably, the metal powder(s) may be nickel (Ni) powders and the fine nickel powders, each having a spherical or a thorny structure and a small particle diameter of several tenths of a micron, for example, 0.01~1.8 μm. A more preferable particle diameter is between 0.05~0.3 μm. These fine metal particles may aggregate to form irregular filamentary aggregates and the sizes D of the filamentary aggregates are estimated to be in the range of 2~50 for example. The conductive powder(s) may be purchased from, but not limited to, Inco® nickel power Type 210, 210H, 240 and 255. The amount of the metal powder(s) is about 2-65% on the basis of the total weight of the mixture.

Alternatively, the material of the conductive connectors 30 may be a mixture of conductive particles dispersed in a resin. The conductive particle may be composed of a thorny or spiked polymeric particle with a Ni/Au overcoating, for example. The resin may be epoxy resin(s), and other suitable additives, such as hardeners, de-foamers, thixotropic reagents and appropriate catalyst(s) may be added to the resin if needed. The epoxy resin(s) may be Bisphenol-A, Bisphenol-F, phenolic, Novolac or any other modified epoxy resins.

Figure 3:
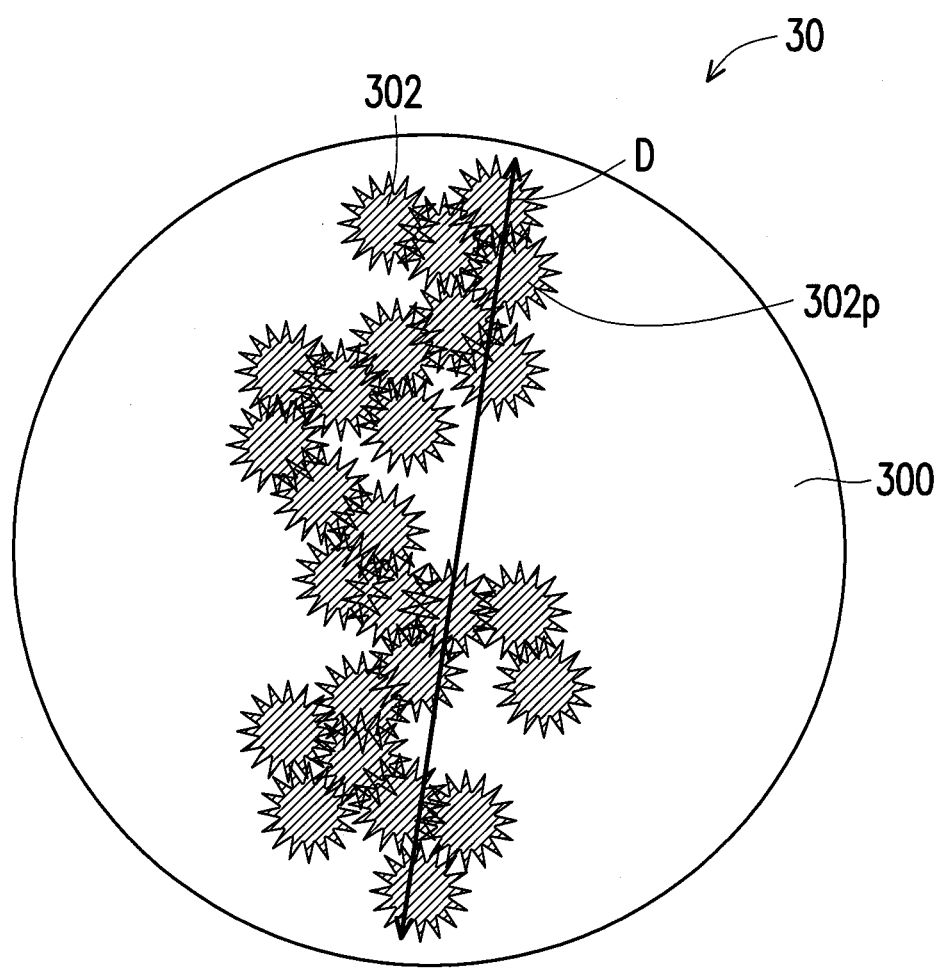
FIG. 3 is a schematic diagram showing one single conductive connector containing the filamentary aggregate of the fine conductive powders according to one embodiment of the present invention.

FIG. 3 is a schematic diagram showing one single conductive connector containing the filamentary aggregate of the fine conductive powders according to one embodiment of the present invention. In general, the conductive connector 30 at least includes the filamentary aggregate(s) 302 consisting of fused conductive particles 302p dispersed in the resin 300. The structure of the filamentary aggregate(s) 302 is flexible and bendable, so that the filamentary aggregate(s) 302 may be crushed and deformed when being subjected to the pressure from the pressing process. As the conductive powders can prick through the alignment layer and directly contact with the conductive ITO glass plate, better electric contacts with the conductive ITO glass plate are established.

If the cell gap between the two connected substrate surfaces (i.e. the top and bottom layers) is unequal, smaller conductive particles may fail to electrically connect the substrate surfaces with a relatively larger gap there-between, resulting in failed electric conductivity. Instead, using the conductive connectors containing the filamentary aggregates of the fine conductive powders as proposed in the present invention, regardless the cell gap of the LCD or LCOS panels is unequal or not, the conductive connectors can easily achieve good electric connections with the substrates, because the filamentary nickel powder can be easily compressed and deformed under pressure.

Furthermore, if the fine conductive powders are small enough to be the primary particles (e.g. 0.01~0.3 μm in particle diameters), the specific surface area of these metal (e.g. nickel) powders should be around ten times that of the traditional conductive spheres, which means a ten-fold increase of the electric conductivity for the filamentary nickel aggregates.

Also, by applying a magnetic field to the thistly conductive powders, the thistly conductive powders will align along the direction of the magnetic field and better electric conductivity can be achieved for the display panels.

In general, according to the previous embodiment, if the conductive connectors containing the filamentary aggregates of the fine conductive powders are applied directly on the alignment layer and in the Vcom areas, good electric conductivity is attained for the display panels, as the spiked conductive powders can prick through the alignment layer.

According to another embodiment, if the conductive connectors containing the filamentary aggregates of the fine conductive powders are applied directly on the substrate (i.e. with the patterned alignment layer) and in the Vcom areas, electric conductivity better than using the gold balls is achieved for the display panels because the highly-integrated filamentary aggregates have good compressibility to fit the cell gap.

Because of these thorny fine conductive powders contained in the conductive connectors, the LCD panels of better electric conductivity and lowered electric resistance are obtained.

Accordingly, the present invention provides a LCD panel connected through a plurality of conductive connectors containing filamentary aggregates of thistly conductive powders, which has better electric conductivity and improved reliability.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A liquid crystal display panel, comprising:
   a bottom layer;
   a first alignment layer, disposed on the bottom layer;
   a liquid crystal layer, disposed on the first alignment layer;
   a second alignment layer, disposed on the liquid crystal layer;
   a top layer, disposed on the second alignment layer; and
   a plurality of conductive connectors, electrically connecting the top layer and the bottom layer, wherein each of the plurality of conductive connectors includes filamentary aggregates of conductive powders, the plurality of conductive connectors is located at corner areas of a non-display area and the plurality of conductive connectors pierces through the first and second alignment layers and is in direct contact with the top layer and the bottom layer.

2. The display panel of claim 1, wherein the display panel has a display area and the non-display area outside and surrounding the display area, and the plurality of conductive connectors is located in the non-display area.

3. The display panel of claim 2, wherein areas of the conductive connectors are regions for applying a common voltage (Vcom).

4. The display panel of claim 1, wherein the top layer is an indium tin oxide (ITO) glass plate and the bottom layer is a silicon chip.

5. The display panel of claim 1, wherein a material of the first alignment layer includes polyimide oblique silicon oxide and a material of the second alignment layer is polyimide oblique silicon oxide.

6. The display panel of claim 1, wherein the conductive powders dispersed in a resin and the conductive powders aggregate to form the filamentary aggregates.

7. The display panel of claim 6, wherein sizes of the filamentary aggregates are in a range of 2~50 μm.

8. The display panel of claim 1, wherein the conductive powders are nickel (Ni) powders, nickel alloy powders, silver (Ag) powders, gold (Au) powders, copper (Cu) powders, platinum (Pt) powders, graphite powders or powders of conducting polymers.

9. The display panel of claim 8, wherein the conductive powders are nickel (Ni) powders and each of the nickel powders has a thorny or spherical structure and a particle diameter of several tenths of a micron.

10. The display panel of claim 9, wherein the nickel powders are of a particle diameter of 0.01~1.8 μm.

11. The display panel of claim 1, wherein the conductive powders are polymeric particles and each of the polymeric particles is coated with a Ni/Au overcoating.

* * * * *